No. 676,360. Patented June 11, 1901.
F. GAUDLITZ.
SLED RUNNER.
(Application filed Feb. 9, 1901.)

(No Model.)

Witnesses
S. Brashears
M. C. Lyddane

Inventor
Fritz Gaudlitz
per G. Dittmar.
Atty

UNITED STATES PATENT OFFICE.

FRITZ GAUDLITZ, OF GRÖFENTHAL, GERMANY.

SLED-RUNNER.

SPECIFICATION forming part of Letters Patent No. 676,360, dated June 11, 1901.

Application filed February 9, 1901. Serial No. 46,682. (No model.)

*To all whom it may concern:*

Be it known that I, FRITZ GAUDLITZ, a citizen of Germany, residing at Gröfenthal, in the Duchy of Saxony, Meiningen, Germany, have invented certain new and useful Improvements in Sledge-Runners; and I do hereby declare the following to be a full, clear, and exact description of the invention, such as will enable others skilled in the art to which it appertains to make and use the same.

This invention relates to sledge-runners adapted to be attached to the wheels and running-gear of carriages or wagons, the object of the invention being to provide an improved type of runners which may be readily secured to or removed from the vehicles when desired and which shall be of simple, cheap, and economic construction.

With this object in view my invention consists in the improved construction, arrangement, and combination of parts hereinafter fully described and afterward specifically claimed.

Figure 1:
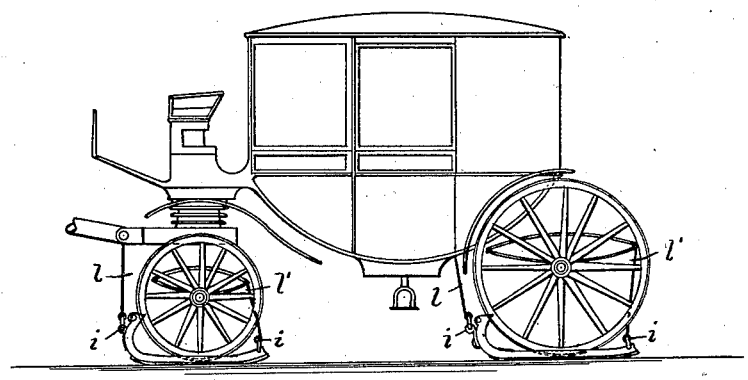
Figure 2:
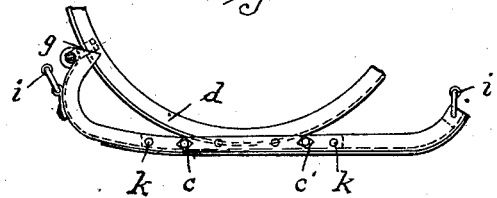
Figure 3:
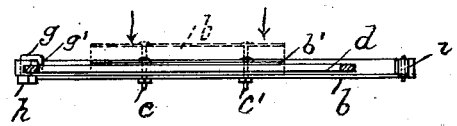
Figure 4:
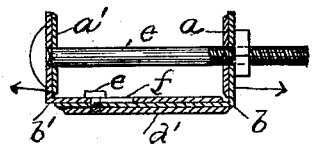

In the accompanying drawings, Figure 1 represents a set of sledge-runners constructed in accordance with my invention applied to the wheels of a carriage. Fig. 2 is a detail view, in side elevation, on an enlarged scale, showing part of a wheel-rim and a runner applied thereto. Fig. 3 is a detail view showing the parts illustrated in Fig. 2 in plan. Fig. 4 is a transverse sectional view through a runner and one of its securing-bolts.

Like letters of reference mark the same parts.

Referring to the drawings by letters, $b\ b'$ indicate angle-irons, which form the body of the runners, the upright portions of which are lined inside with felt, as at $a\ a'$, whereby when said upright portions are clamped against the tire $d$ by means of clamping-bolts $c\ c'$ the tire and rim of the wheel will not be marred by contact with the angle-irons. The horizontal portions of the angle-irons overlap each other, one being provided with transverse slots $f$ and the other with screws $e$ engaging therein, whereby the angle-irons may be laterally adjusted to bring the upright portions to proper distances apart to fit different thicknesses or width of tires or rims. On the horizontal portion of the outside or lower angle-iron may be secured a suitable shoe or slide-plate, as at $d'$. The angle-irons may be long enough in light carriages or wagons to permit of a single runner being clamped to the front and hind wheel on one side of the vehicle; but in heavier vehicles separate runners may be used for each wheel, as shown in the drawings. A number of holes $k$ may be made in the angle-irons to accommodate clamp-bolts $c\ c'$ in securing the runners to wheels of different sizes.

At the front end of each runner is a clamping-bolt $g$, provided on one side of its head, as at $g'$, with a hook to engage the tire or rim and having a nut $h$ to secure it in engagement therewith. At the ends of the angle-irons are provided loops or links, as at $i\ i$, to which are secured the lower ends of straps or chains $l\ l'$, the upper ends of which are secured to the running-gear of the vehicle.

By means of the constructions described the runners may be quickly secured in position upon or removed from wheels of different sizes by means of an ordinary wrench and when in position will be rigidly held against accidental displacement.

Having thus fully described my invention, what I claim as new, and desire to secure by Letters Patent of the United States, is—

1. In a runner for attachment to vehicle-wheels the combination of two angle-irons forming the main body thereof, the horizontal portions of said angle-irons being overlapped and the upright portions serving to embrace the tire or rim of the wheel to which the runner is to be attached, means for adjusting the irons laterally to set the upright portions at different distances apart, clamp-bolts for securing the upright portions to the tire, and a hook-bolt for securing the front end of the irons to the wheel, substantially as described.

2. In a runner for attachment to vehicle-wheels the combination of two angle-irons forming the main body thereof, the horizontal portions of said angle-irons being overlapped and the upright portions serving to embrace the tire or rim of the wheel to which the runner is to be attached, means for adjusting the irons laterally to set the upright portions at different distances apart clamp-bolts for securing the upright portions to the tire, links at each end of the irons, straps for connecting said links to the running-gear of the vehicle, and a hook-bolt for securing the front end of the irons to the wheel, substantially as described.

In testimony whereof I affix my signature in presence of two witnesses.

FRITZ GAUDLITZ.

Witnesses:
 FRANZ STEPHAN,
 A. BRÄUTIGAM.